US011038330B2

(12) United States Patent
Kurata et al.

(10) Patent No.: US 11,038,330 B2
(45) Date of Patent: Jun. 15, 2021

(54) ELECTRIC CONNECTION BOX

(71) Applicant: YAZAKI CORPORATION, Tokyo (JP)

(72) Inventors: Sho Kurata, Makinohara (JP); Hideki Kawamura, Makinohara (JP); Minoru Umezaki, Makinohara (JP); Junya Masuda, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 19 days.

(21) Appl. No.: 16/786,952

(22) Filed: Feb. 10, 2020

(65) Prior Publication Data
US 2020/0295553 A1 Sep. 17, 2020

(30) Foreign Application Priority Data
Mar. 11, 2019 (JP) .............................. JP2019-044084

(51) Int. Cl.
H02G 3/00 (2006.01)
H02G 3/16 (2006.01)
H02G 3/08 (2006.01)
B60R 16/023 (2006.01)
H02G 3/10 (2006.01)

(52) U.S. Cl.
CPC ............ *H02G 3/16* (2013.01); *B60R 16/0239* (2013.01); *H02G 3/081* (2013.01); *H02G 3/088* (2013.01); *H02G 3/10* (2013.01)

(58) Field of Classification Search
CPC .......... H02G 3/16; H02G 3/081; H02G 3/088; H02G 3/01; B60R 16/0239
See application file for complete search history.

(56) References Cited

U.S. PATENT DOCUMENTS

| 9,241,417 | B2* | 1/2016 | Soh ..................... B60R 16/0239 |
| 2003/0136780 | A1* | 7/2003 | Sato ....................... H02G 3/088 |
| | | | 220/3.8 |
| 2014/0246215 | A1* | 9/2014 | I ............................. H02G 3/081 |
| | | | 174/50 |

FOREIGN PATENT DOCUMENTS

JP 2017-127078 A 7/2017

* cited by examiner

*Primary Examiner* — Pete T Lee
(74) *Attorney, Agent, or Firm* — Kenealy Vaidya LLP

(57) ABSTRACT

An electric connection box includes a fitting component having a peripheral wall, a housing having a fitting holding portion, a first water stop portion provided along a first opening end edge of the peripheral wall, a second water stop portion provided along a second opening end edge of the peripheral wall, and a guide lock. The guide lock guides the fitting component with respect to the fitting holding portion along an extending direction of the first opening end edge, and guides the fitting component by a fitting stroke distance along a fitting direction along the first opening end edge and the second opening end edge such that the fitting component is fitted and held. The fitting stroke distance is shorter than a length of the first water stop portion and the second water stop portion.

4 Claims, 12 Drawing Sheets

ELECTRIC CONNECTION BOX

CROSS-REFERENCE TO RELATED APPLICATIONS

This application is based on and claims priority under 35 USC 119 from Japanese Patent Application No. 2019-044084 filed on Mar. 11, 2019, the contents of which are incorporated herein by reference.

TECHNICAL FIELD

The present disclosure relates to an electric connection box.

BACKGROUND ART

Patent Literature 1 discloses an in-vehicle electric connection box, in which an electric component such as a fuse or a relay is detachably mounted there. In the in-vehicle electric connection box, a connection body in which the electronic component is assembled is layered in two stages in an up-down direction in a connection body accommodating chamber of a housing, so as to improve accommodation property of the electronic component accommodated inside the housing.

The electric connection box of Patent Literature 1 includes: a connection body to which an electric wire is assembled, the electric wire being electrically connected to an electronic component and a terminal of the electronic component; and a housing which accommodates and holds a plurality of the connection bodies which are spaced apart from each other in a layered state. The housing includes accommodating members in which a connection body accommodating chamber, which is configured to accommodate and hold the connection body, is formed for each connection body layer. Each accommodating member, together with the connection body accommodated and held therein, is attachable to and detachable from each other between adjacent layers.

The accommodating member which accommodates a lower layer connection body is integrally formed with an accommodating chamber for accommodating and holding electronic components and connection bodies that are not in a stacked state. A fitting holding portion, which holds the accommodating member (fitting component) for accommodating an upper layer connection body in an attachable and detachable manner, is partitioned and formed on a side surface of the housing. The accommodating member that accommodates the upper layer connection body includes a peripheral wall which has a substantially U-shaped cross-section and forms an outer side surface of the accommodating member. The peripheral wall is assembled such that two opening end edges thereof face two side walls of the fitting holding portion while a lower end edge of the peripheral wall faces an upper end edge of the fitting holding portion (an upper end edge of the accommodating member that accommodates the lower layer connection body). At this time, the accommodating member that accommodates the upper layer connection body is fitted to the lower layer connection body in a stacking direction by a lock mechanism formed by a guide portion and a lock portion provided on an inner wall which connects an opening end side of the peripheral wall, and another lock mechanism formed by a guide portion and a lock portion provided on an inner wall of the fitting holding portion, so as to form an engaged state (locked state). That is, the accommodating member that accommodates the upper layer connection body is held to be attachable to and detachable from the fitting holding portion of the housing.

Patent Literature 1: JP2017127078A

In this type of electric connection box, it is desirable to provide a water stop structure that prevents water or the like from entering facing portions of the two opening end edges of the peripheral wall of the accommodating member that accommodates the upper layer connection body and the two side walls of the fitting holding portion.

For example, in an accommodating member 510 shown in FIG. 12 according to related art, water stop portions 514, 515 are provided along two opening end edges 512, 513 of a peripheral wall 511. The water stop portions 514, 515 respectively includes inner side walls 512a, 513a and outer side wall 512b, 513b which cover side end edges (not shown) of two facing side walls of a fitting holding portion from inside and outside.

However, in a fitted portion which is difficult to be seen from the side of an operator, when a lock mechanism 525 (a guide portion 521 and a lock portion 523) located on an accommodating member side and a lock mechanism (not shown located on a fitting holding portion side are in an engaged state, workability of an assembling operation of the accommodating member 510 is poor, since the water stop portions 514, 515 at the two opening end edges 512, 513 of the peripheral wall 511 must he fitted. to the side end edges of the facing side walls of the fitting holding portion, respectively.

The inner side walls 512a, 513a and the outer side walls 512b, 513b of the water stop portions 514, 515 are provided along a height direction (a height direction in FIG. 12) of the opening end edges 512, 513 and extend substantially in parallel along an extending direction of the opening end edges 512, 513 of the peripheral wall 511, so as to form a water stop structure (labyrinth structure) between the side end edges of the side walls of the fitting holding portion. Here, in a case where the first opening end edge 512 and the second opening end edge 513 of the peripheral wall are extended at the same angle (parallel) in the extending direction, the inner side walls 512a, 513a and the outer side walls 512b, 513b of the water stop portions 514, 515 of the accommodating member 510 can be fitted from a tip end side (front side) of the side wall of the fitting holding portion.

However, in a case where the first opening end edge and the second opening end edge of the peripheral wall are extended at different angles in the extending direction, at least one of the inner side walls 512a, 513a will interfere with the corresponding side wall of the fitting holding portion when the accommodating member 510 is fitted from the tip end side of the side wall of the fitting holding portion. Therefore, the inner side walls 512a, 513a and the outer side walls 512b, 513b of the water stop portions 514, 515 of the accommodating member 510 must be fitted from an upper end side of the side wall of the fitting holding portion. As a result, the accommodating member 510 requires a fitting stroke distance S2, which corresponds to the height of the opening end edges 512, 513 of the peripheral wall 511, with respect to the fitting holding portion, thus a degree of freedom of assembly of the accommodating member 510 is reduced.

SUMMARY OF INVENTION

The present disclosure relates to an electric connection box in which a fitting component is easily assembled to a fitting holding portion of a housing.

In accordance with an aspect of non-limiting embodiments of the present disclosure, an electric connection box includes a fitting component, a housing, a peripheral wall, a first water stop portion, a second water stop portion, and a guide lock. in the fitting component, an electronic component and an electric wire electrically connected to the electronic component are assembled. The housing includes a fitting holding portion. The fitting holding portion is configured to fit with and hold the fitting component. The peripheral wall forms an outer side surface of the fitting component. The first water stop portion is provided along a first opening end edge of the peripheral wall. The first water stop portion includes an inner side wall and an outer side wall. The inner side wall and the outer side wall of the first water stop portion covers a side end edge of a first side wall of the fitting holding portion from inside and outside. The second water stop portion is provided along a second opening end edge of the peripheral wall. The second water stop portion includes an inner side wall and an outer side wall. The inner side wall and the outer side wall of the second water stop portion covers a side end edge of a second side wall of the fitting holding portion from inside and outside. The guide lock is provided between the fitting holding portion and the fitting component to guide the fitting component with respect to the fitting holding portion along an extending direction of the first opening end edge, and to guide the fitting component by a fitting stroke distance along a fitting direction orthogonal to the extending direction along the first opening end edge and the second opening end edge such that the fitting component is fitted and held. The fitting stroke distance is shorter than a length of the first water stop portion and the second water stop portion.

DESCRIPTION OF EMBODIMENTS

Figure 3:
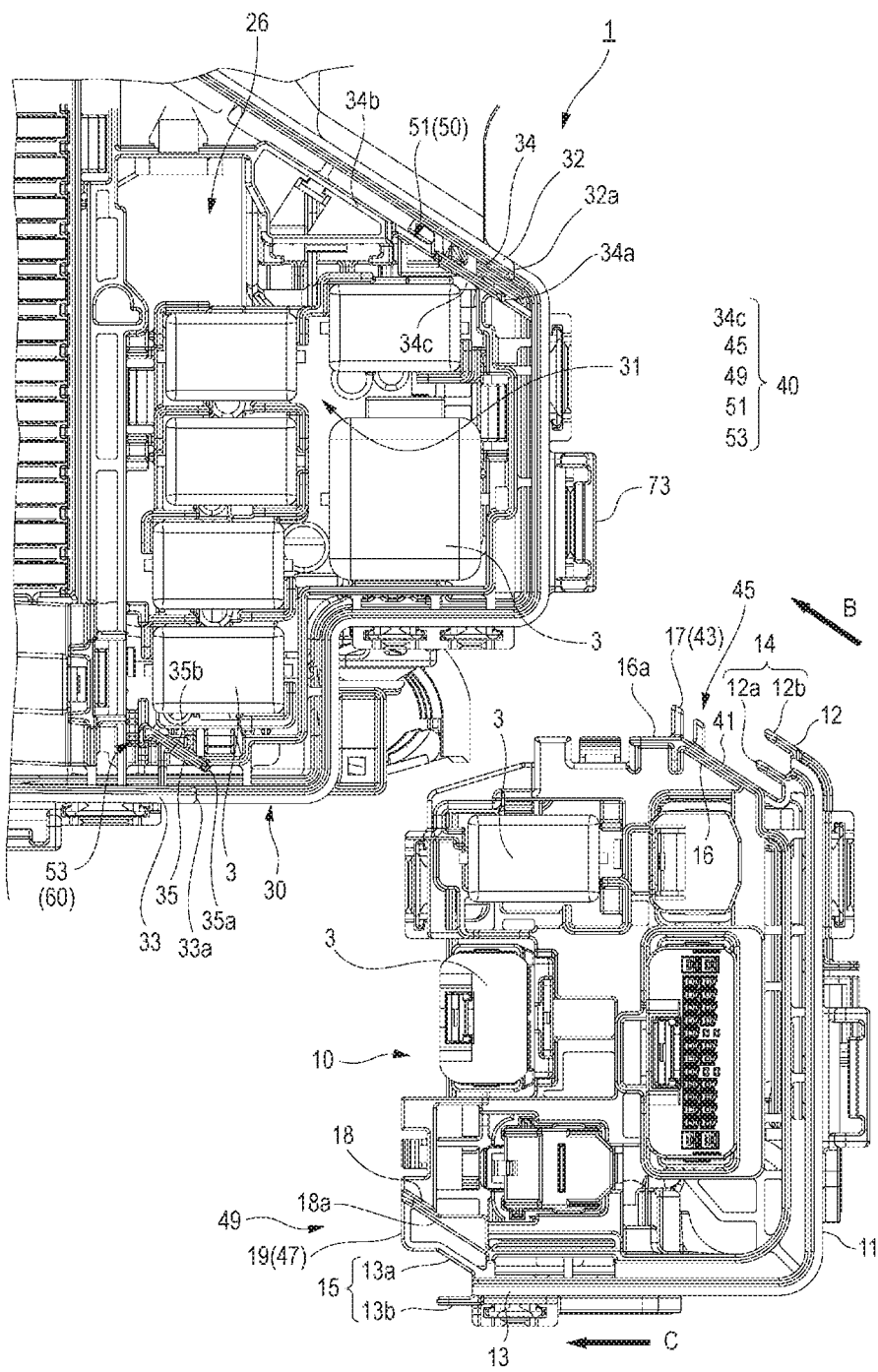
FIG. 3 is a main part plan view before the fitting component is fitted to a fitting holding portion of the housing shown in FIG. 1.
Figure 4:
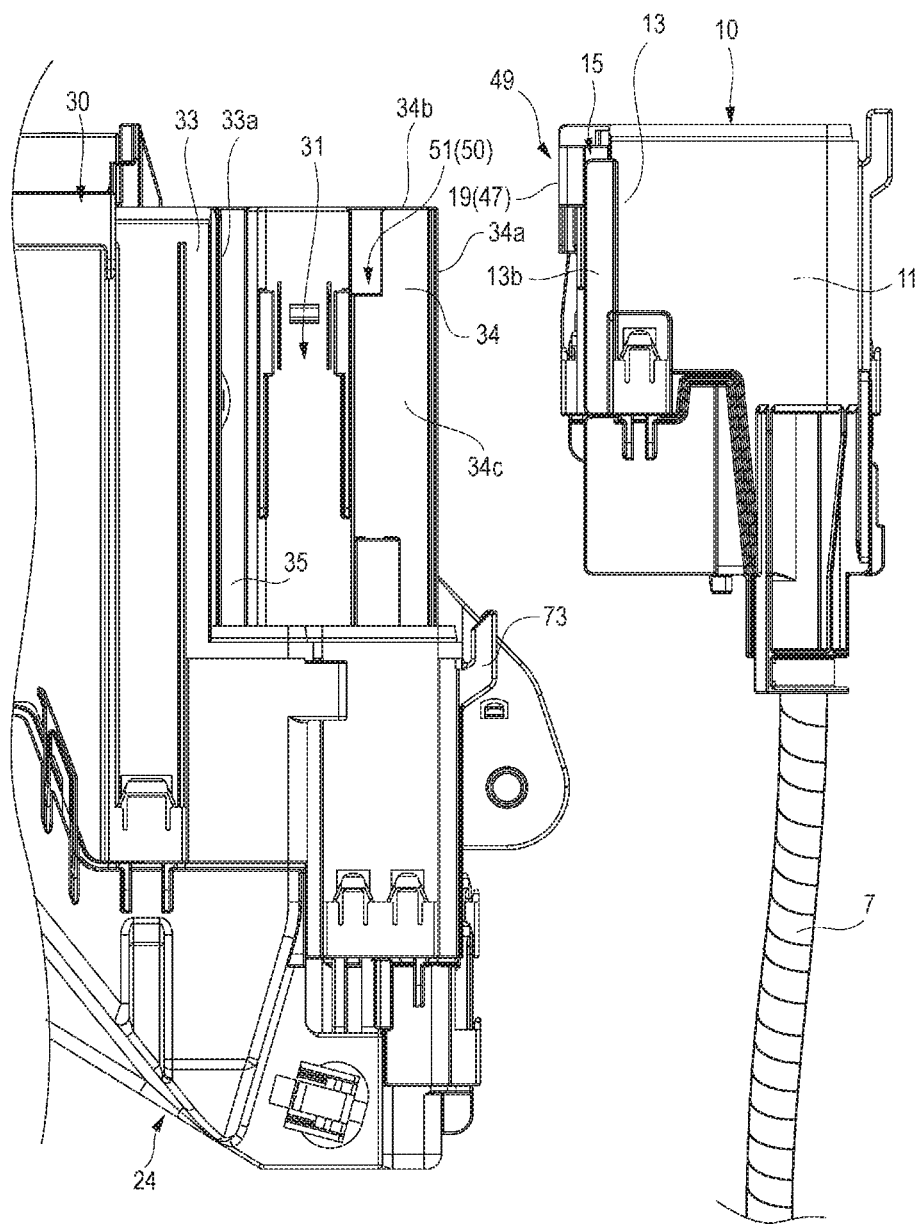
FIG. 4 is a main part side view of the housing and the fitting component shown in FIG. 3.

Embodiments will he described below with reference to the drawings. is a perspective view showing a state in which first and second upper covers 21, 22 are removed from an electric connection box 1 according to an embodiment. FIG. 2 is a perspective view showing a state in which a fitting component 10 is removed from a housing 30 of a case body 20 shown in FIG. 1. FIGS. 3 and 4 are a main part plan view and a main part side view before the fitting component 10 is fitted to a fitting holding portion 31 of the housing 30 shown in FIG. 1.

The electric connection box 1 according to the present embodiment is placed on a vehicle, for example, and is interposed between a power source (not shown) of the vehicle (secondary battery) and an electronic device to adjust power supplied from the power source to the electronic device. The electric connection box 1 may be referred to as a relay box, a fuse box, a connection box, or the like.

Figure 1:
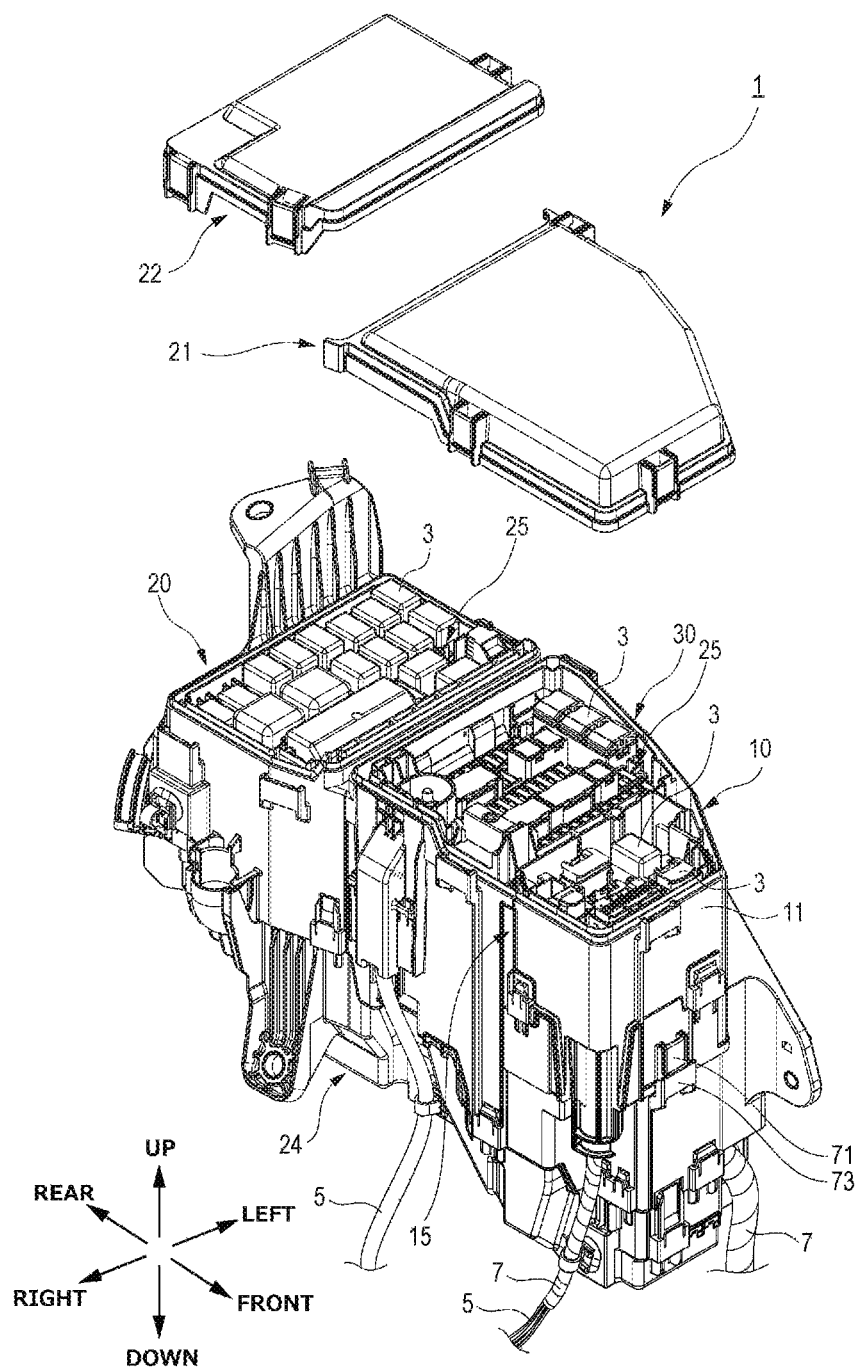
FIG. 1 is a perspective view showing a state in which covers of an electric connection box according to an embodiment are removed.
Figure 2:
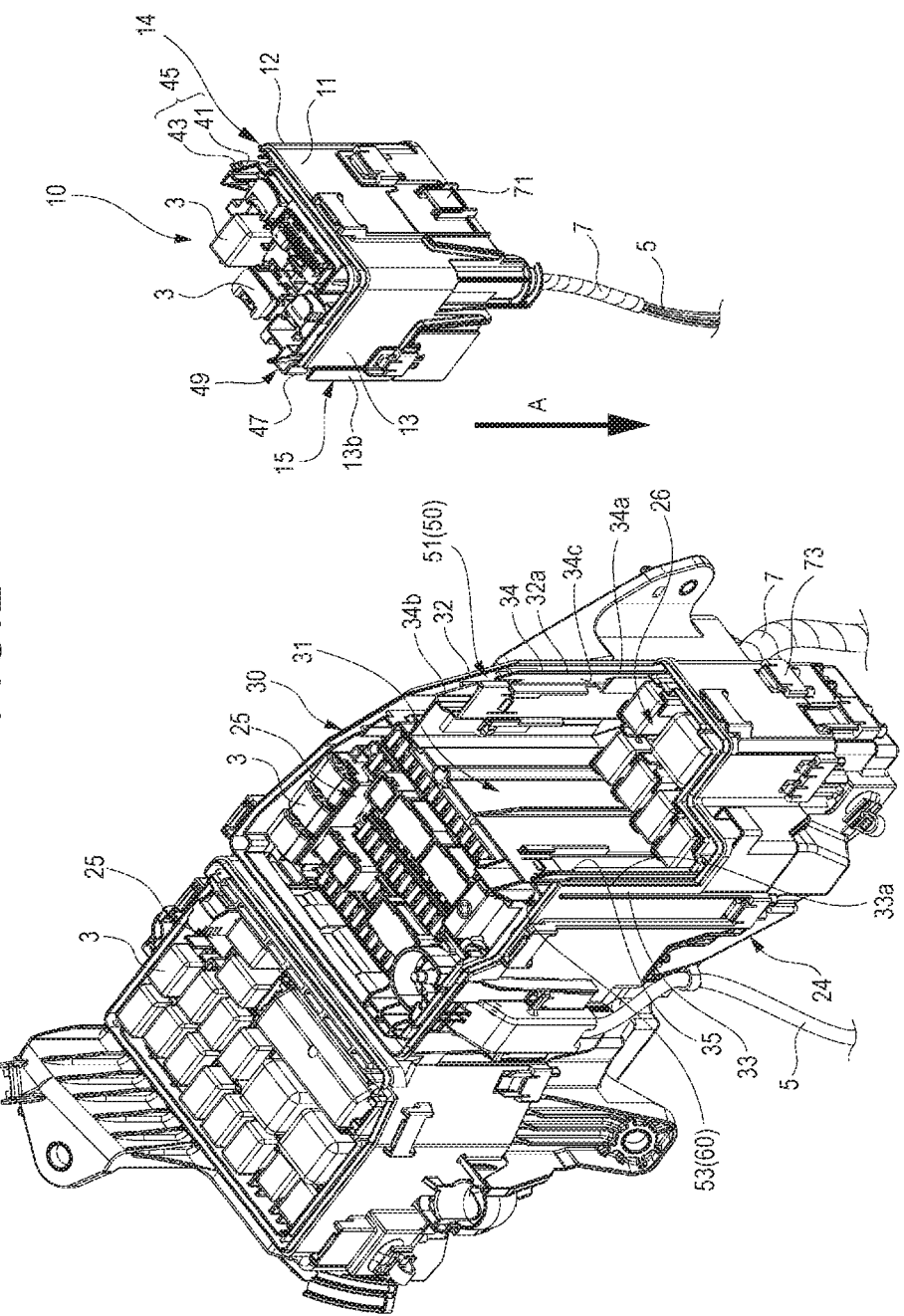
FIG. 2 is a perspective view showing a state in which a fitting component is removed from a housing of a case body shown in FIG. 1.

In the electric connection box 1 according to the present embodiment, as shown in FIGS. 1 and 2, a plurality of electronic components 3 are accommodated in the case body 20 including a housing 30, a fitting component 10 that is fitted with and held by the fitting holding portion 31 of the housing 30. and a lower cover 24 that covers a lower opening of the housing 30, which are made of insulating resin, for example, and an upper opening of the housing 30 is covered by the first and second upper covers 21, 22.

The electronic component 3 accommodated in the case body 20 is, for example, a relay, a fuse, a fusible link, or the like. The electronic component 3 includes an electronic component body (not shown) such as a relay body or a fuse body disposed inside the housing 30, and a plurality of terminals (not shown) serving as electric connection portions which are electrically connected to the electronic component body. Electric wires 5 are electrically connected to the terminals of the electronic components 3.

One end portion of each electric wire 5 which is electrically connected to the terminal of the electronic component 3 is electrically connected to the terminal of the electronic component 3, while the other end portion thereof is electrically connected to the power source (secondary battery) or the electronic device. The electric wire 5 is electrically connected to the terminal of the electronic component 3 via, a counterpart terminal (not shown). A plurality of the electric wires 5 drawn out from the case body 20 are bundled together by an exterior material 7 such as an adhesive tape or a corrugated tube.

As shown in FIG. 2, the housing 30 according to the present embodiment includes the fitting holding portion 31 configured to fit with and hold the filling component 10, and a plurality of electronic component accommodating chambers 25, 26 configured to accommodate and hold the plurality of electronic components 3. A plurality of the electronic components 3 are accommodated and disposed in the electronic component accommodating chamber 25 so as to be exposed from the upper opening of the housing 30. A plurality of the electronic components 3 are accommodated and disposed in the electronic component accommodating chamber 26 so as to be stacked below the fitting component 10. Needless to say, the arrangement of the plurality of electronic component accommodating chambers 25, 26 is not limited thereto, and various arrangements are possible.

In the electric connection box 1 of the present specification, for convenience of description, a side to which the fitting component 10 of FIG. 1 is assembled is referred to as a front side, an opposite side thereof is referred to as a rear side, a side where the electric wire 5 is drawn out from the fitting component 10 is referred to as a right side, and an opposite side thereof is referred to as a left side. A fitting direction (a direction of arrow A), along which the fitting component 10 guided in a horizontal direction from the diagonally right front of the fitting holding portion 31 and reaching a fitting start position is guided to a fitting end position below is extended from an upper side to a lower side of the electric connection box 1. Therefore, in the present specification, front, rear, up, down, left, and right directions are as shown by arrows in FIG. 1.

As shown in FIGS. 2 and 3, the fitting holding portion 31 according to the present embodiment is defined and formed on a side surface of the housing 30, so as to fit with and hold the fitting component 10 above the lower electronic component accommodating chamber 26 in an attachable and detachable manner.

The fitting holding portion 31 includes a first side wall 32 and a second side wall 33 which respectively extend forward from two side walls of the housing 30 that define the electronic component accommodating chamber 25.

A first inner wall portion 34 is arranged in parallel with the first side wall 32 of the fitting holding portion 31 on an inner side thereof. An inner surface of the first inner wall portion 34 provided in parallel with the first side wall 32 is in sliding contact with a fitting reference surface 41 of a first guide portion 45 of the fitting component 10 described below. An upper end edge 34b of the first inner wall 34 is provided with a first engaged portion 50 in which a first recessed portion 51 is recessed. A pair of first engagement protruding portions 17, which are a first engagement portion 43 of the first guide portion 45, are fitted into the first recessed portion 51.

A second inner wall portion 35 is arranged on an inner side of the second side wall 33 of the fitting holding portion 31. A second engaged portion 60 in which a second recessed portion 53 is recessed is provided on an upper end edge 35b of the second inner wall portion 35 provided in parallel with the first side wall 32. A second engagement protruding portion 19, which is a second engagement portion 47 of a second guide portion 49 of the fitting component 10 described below, is fitted into the second recessed portion 53.

As shown in FIGS. 1 and 2, the fitting component 10 according to the present embodiment is assembled with the electronic component 3 and the electric wire 5 which is electrically connected to the electronic component 3. The plurality of electric wires 5 drawn out from the fitting component 10 fitted with and held by the fitting holding portion 31 are bundled together by the exterior material 7 and guided downward along a right outer surface of the lower electronic component accommodating chamber 26. A lower end portion of the electric wire 5 is electrically connected to the electronic device (not shown). The fitting component 10 according to the present embodiment has a divided structure in which the fitting component 10 includes the electronic component accommodating chambers in a vertically stacked state. Needless to say, the structure of the fitting component 10 is not limited to such a stacked structure, and may be a single-layer structure.

The fitting component 10 as shown in FIG. 3 includes: a peripheral wall 11, which has a substantially U-shaped cross-section and forms an outer side surface continuous with the two side walls of the housing 30; a first water stop portion 14, which is provided along a. first opening end edge 12 of the peripheral wall 11 and includes an inner side wall 12a and an outer side wall 12b, the inner side wall 12a and the outer side wall 12b covering a side end edge 32a of the first side wall 32 of the fitting holding portion 31 from inside and outside, so as to form a water stop structure; and a second water stop portion 15, which is provided along a second opening end edge 13 of the peripheral wall 11 and includes an inner side wall 13a and an outer side wall 13b, the inner side wall 13a and the outer side wall 13b covering a side end edge 33a of the second side wall 33 of the fitting holding portion 31 from inside and outside, so as to form a water stop structure (labyrinth structure).

In the peripheral wall 11 of the fitting component 10 according to the present embodiment, an extending direction B of the first opening end edge 12 and an extending direction C of the second opening end edge 12 are extended at different angles, respectively. The inner side wall 12a and the outer side wall 12b of the first water stop portion 14 and the inner side wall 13a of the second water stop portion 15 are extended in parallel along the extending direction B of the first opening end edge 12 of the peripheral wall 11, while the outer side wall 13b of the second water stop portion 15 is extended along the extending direction C of the second opening end edge 12 of the peripheral wall 11. The inner side wall 12a, the outer side wall 12b, the inner side wall 13a, and the outer side wall 13b are formed in an elongated plate shape extending along a fitting direction A orthogonal to the extending directions B, C along the first opening end edge 12 or the second opening end edge 12.

Figure 6:
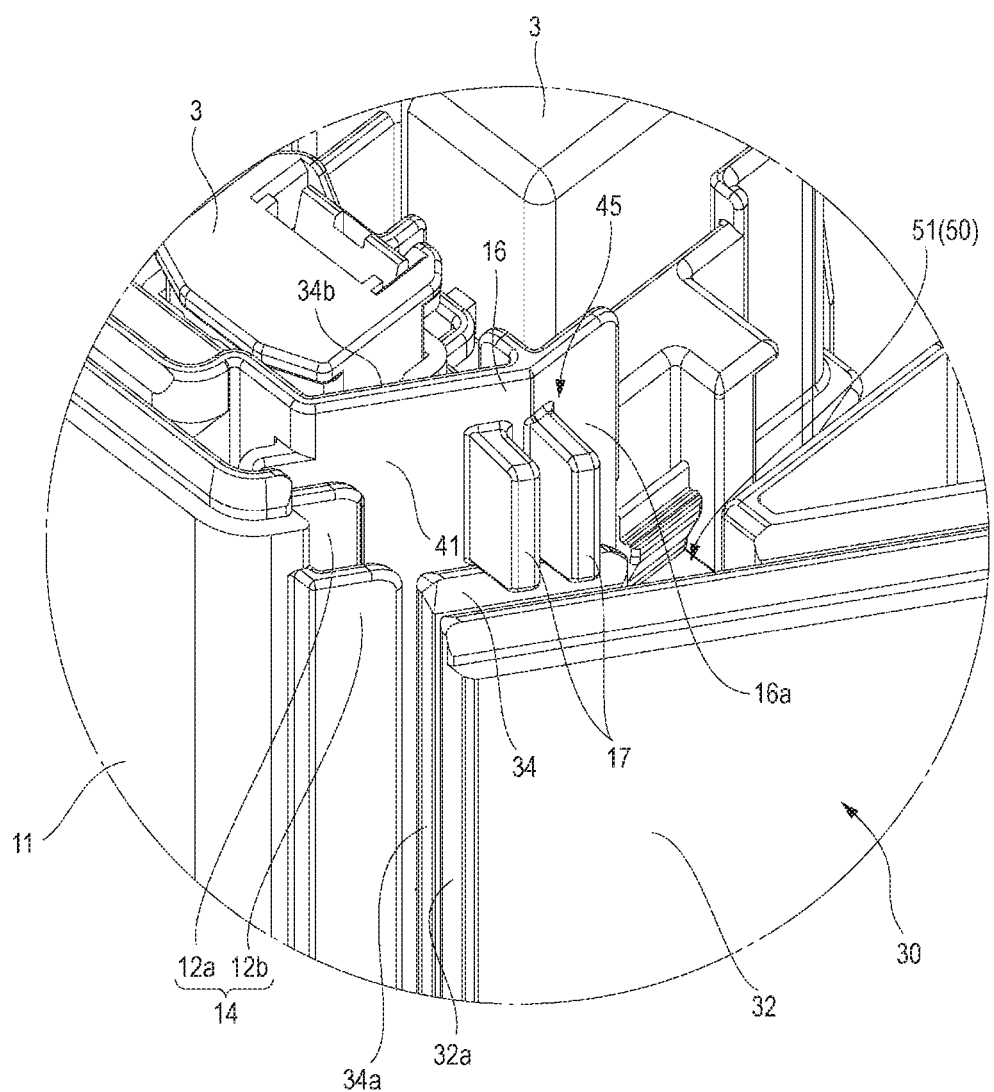
FIG. 6 is a main part enlarged perspective view showing a first guide portion in the process of guiding the fitting component shown in FIG. 5 to the fitting holding portion.

The first guide portion 45 provided inside the first water stop portion 14 includes: the fitting reference surface 41 which is in sliding contact with an inner surface of the first inner wall portion 34 of the fitting holding portion 31 along the extending direction B of the first opening end edge 12; and the first engagement portion 43 which guides the fitting component 10 by a fitting stroke distance S1 along the fitting direction A with respect to the first recessed portion 51 (the first engaged portion 50) recessed in the upper end edge 34b of the first inner wall portion 34 (see, FIG. 6).

The first engagement portion 43 is the pair of first engagement protruding portions 17 which protrude from an outer surface 16a of a first engagement wall 16 provided inside the first water stop portion 14 and engage with the first recessed portion 51.

Figure 7:
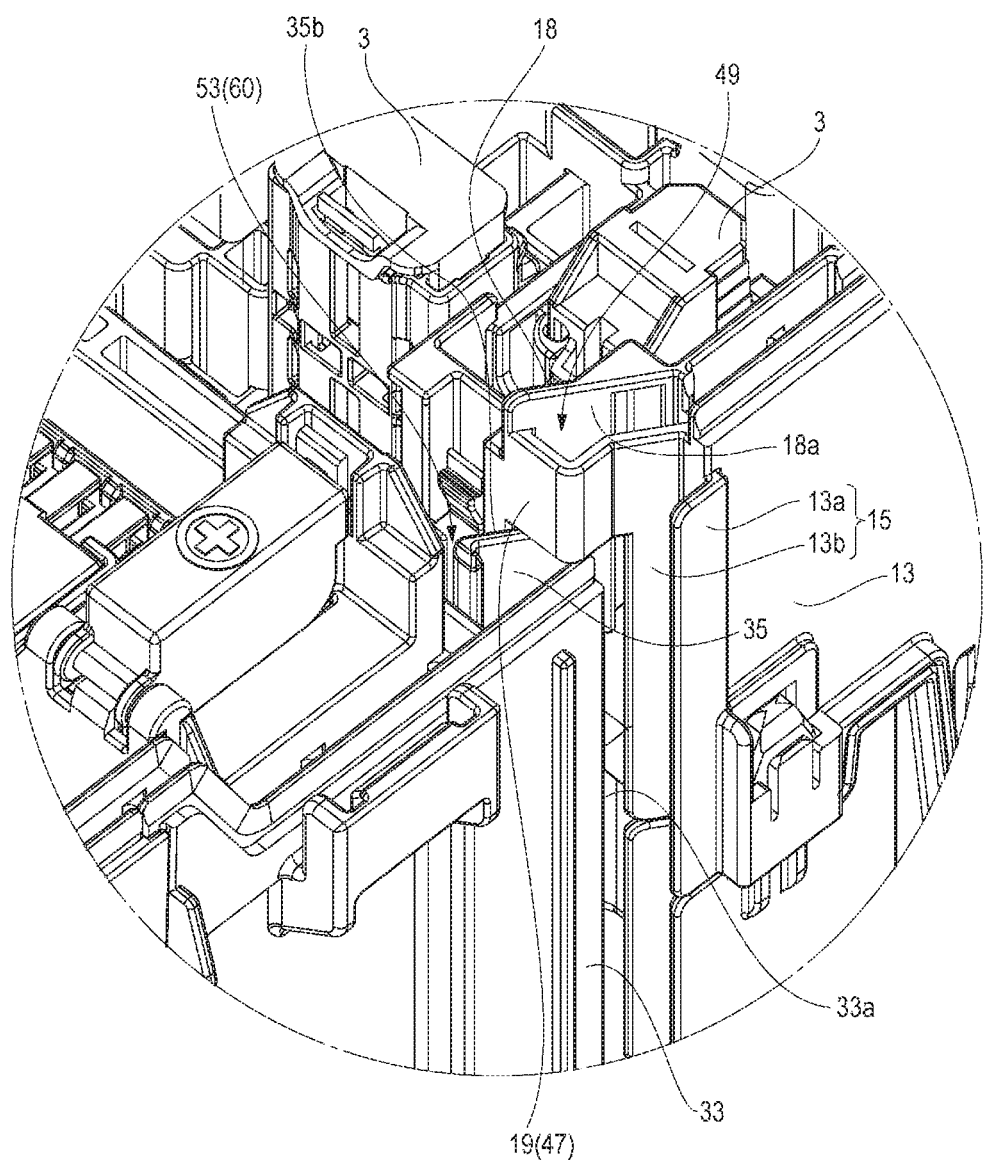
FIG. 7 is a main part enlarged perspective view showing a second guide portion in the process of guiding the fitting component shown in FIG. 5 to the fitting holding portion.

The second guide portion 47 provided inside the second water stop portion 15 includes the second engagement portion 47 which guides the fitting component 10 by the fitting stroke distance SI along the fitting direction A with respect to the second recessed portion 53 (the second engaged portion 60) recessed in the upper end edge 35b of the second inner wall portion 35 (see, FIG. 7).

The second engagement portion 47 is the second engagement protruding portion 19 which protrude from an outer surface 18a of a second engagement wall 18 provided inside the second water stop portion 15 and engage with the second recessed portion 53. A tip end of the second engagement protruding portion 19 according to the present embodiment is connected to a tip end of the inner side wall 13a to improve rigidity.

The electric connection box 1 according to the present embodiment includes a guide lock 40, which is provided between the fitting holding portion 31 and the fitting component 10 to guide the fitting component 10 with respect to the fitting holding portion 31 along the extending direction B of the first opening end edge 12 provided with the first water stop portion 14, and to guide the fitting component 10 by the fitting stroke distance S1 along the fitting direction A orthogonal to the extending directions B, C along the first and the second opening end edges 12, 13 such that the fitting component 10 is fitted and held, the fitting stroke distance S1 being shorter than a length L1 of the first water stop portion 14 and the second water stop portion 15.

The guide lock 40 according to the present embodiment as shown in FIG. 3 includes: an inner surface 34c of the first inner wall portion 34 arranged in parallel with the first side wall 32 of the fitting holding portion 31 on the inner side thereof and the first recessed portion 51 (the first engaged portion 50); the second recessed portion 53 (the second engaged portion 60) of the second inner wall portion 35 provided on the inner side of the second side wall 33 of the fitting holding portion 31; the first guide portion 45 provided inside the first water stop portion 14 of the fitting component 10; and the second guide portion 49 provided inside the second water stop portion 15 of the fitting component 10.

Next, an assembling procedure of the fitting component 10 to be assembled to the fitting holding portion 31 of the housing 30 of the electric connection box 1 will be described.

Figure 5:
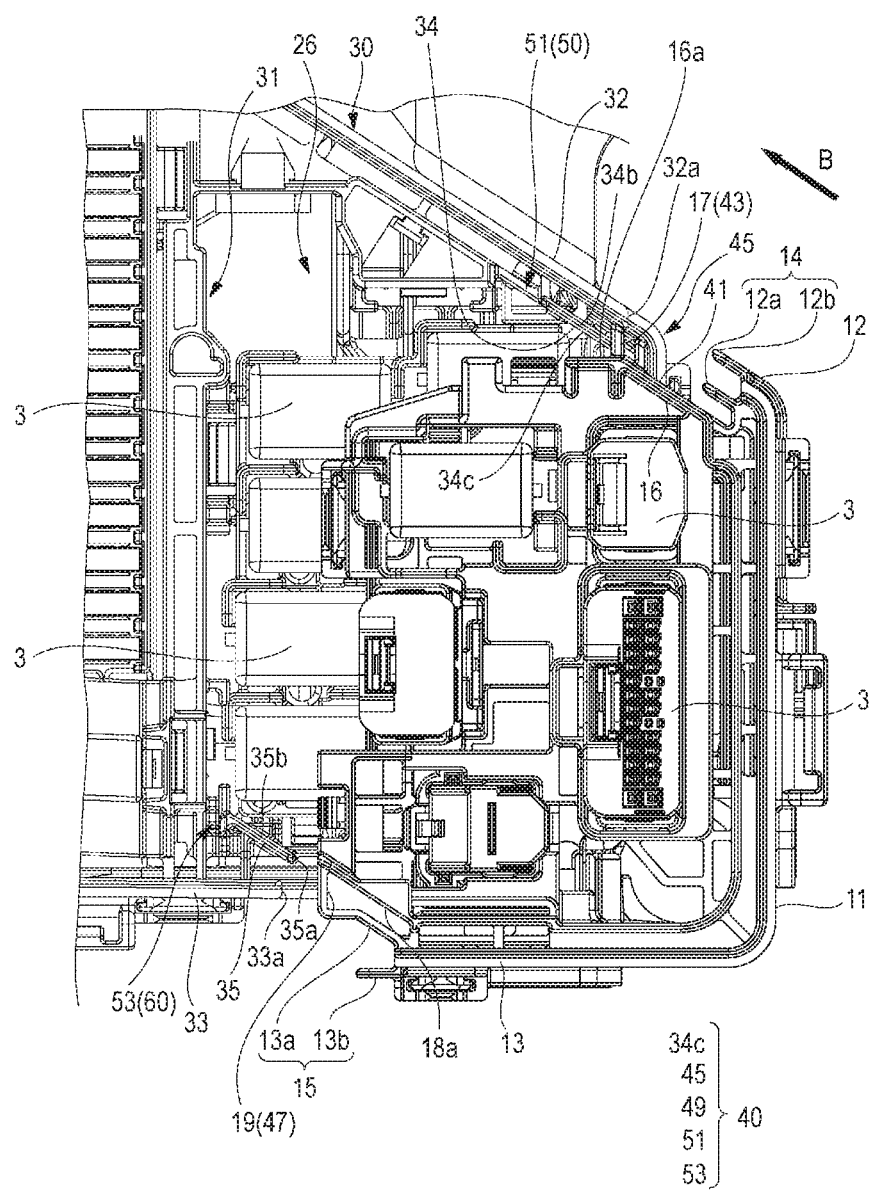
FIG. 5 is a main part plan view in a process of guiding the fitting component shown FIG. 3 to the fitting holding portion of the housing along an extending direction of a first opening end edge.
Figure 8:
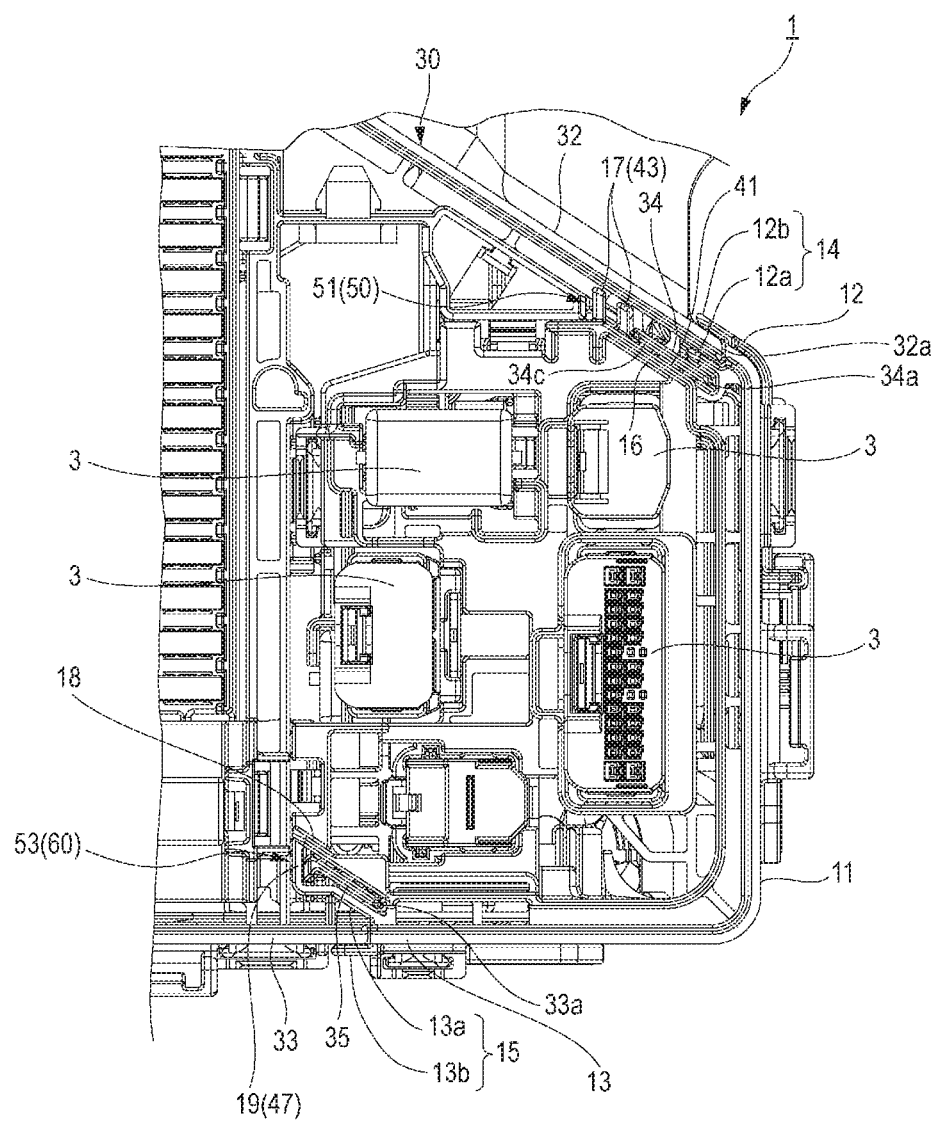
FIG. 8 is a main part plan view after the fitting component is guided to a fitting start position of the fitting holding portion of the housing shown in FIG. 3.
Figure 9:
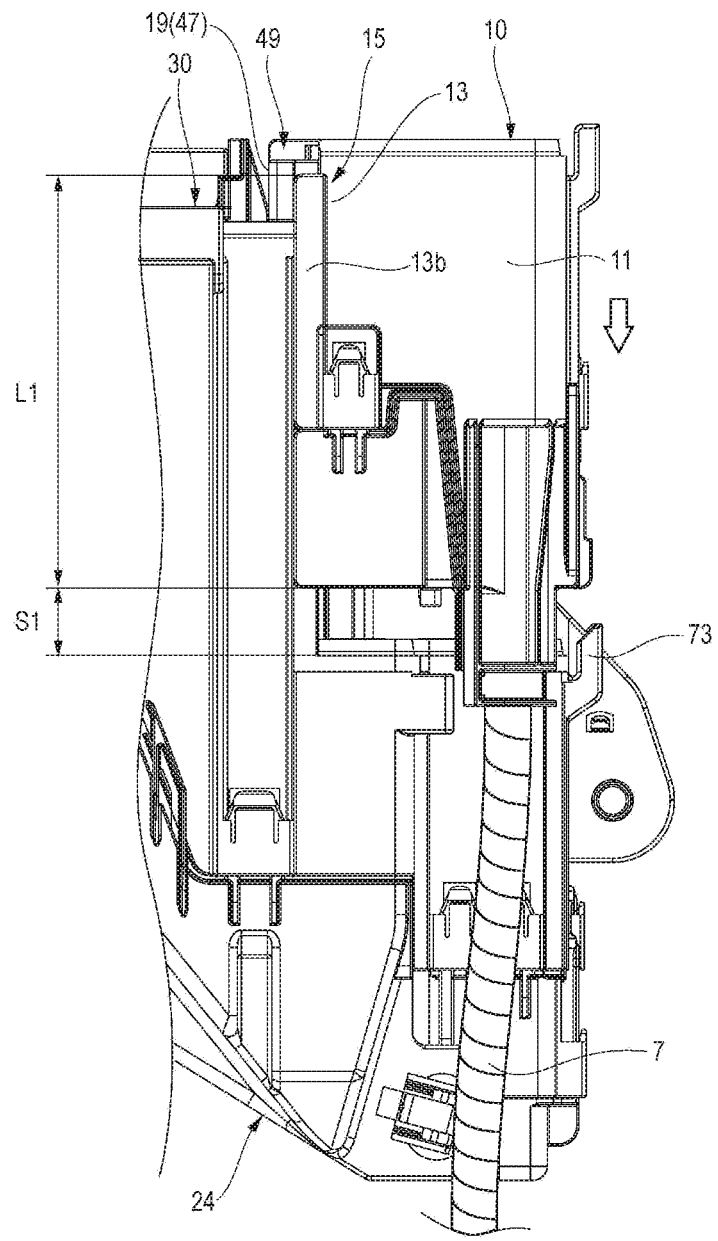
FIG. 9 is a main part side view of the housing and the fitting component shown in FIG. 8.
Figure 10:
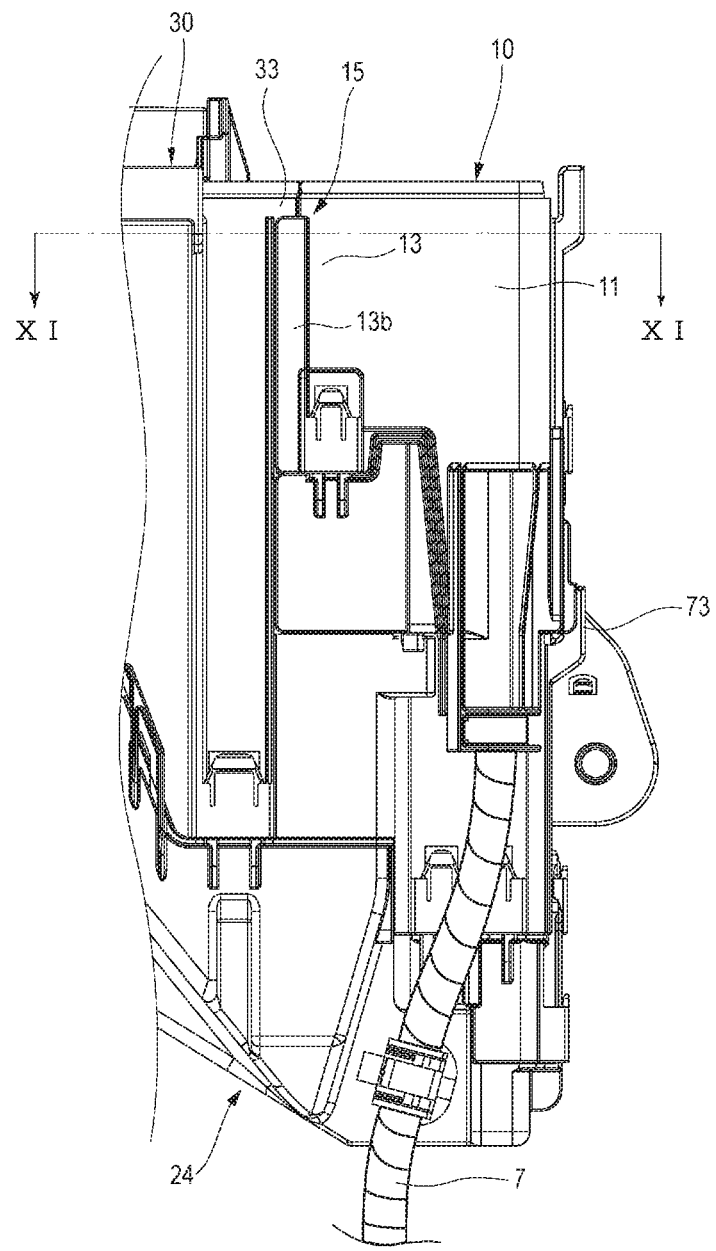
FIG. 10 is a main part plan view after the fitting component shown in FIG. 9 is guided to a fitting end position of the fitting holding portion.

FIG. 5 is a main part plan view in a process of guiding the fitting component 10 shown in FIG. 3 to the fitting holding portion 31 of the housing 30 along the extending direction B of the first opening end edge 12. FIG. 6 is a main part enlarged perspective view showing the first guide portion 45 in the process of guiding the fitting component 10 shown in FIG. 5 to the fitting holding portion 31. FIG. 7 is a main part enlarged perspective view showing the second guide portion 49 in the process of guiding the fitting component 10 shown in FIG. 5 to the fitting holding portion 31. FIG. 8 is a main part plan view after the fitting component 10 is guided to the fitting start position of the fitting holding portion 31 of the housing 30 shown in FIG. 3. FIG. 9 is a main part side view of the housing 30 and the fitting component 10 shown in FIG. 8. FIG. 10 is a main part plan view after the fitting component 10 shown in FIG. 9 is guided to the fitting end position of the fitting holding portion 31.

First, as shown in FIG. 5, the fitting component 10 is inserted into the fitting holding portion 31 of the housing 30 in the horizontal direction from the diagonally right front of the fitting holding portion 31. At this time, the fitting component 10 is guided, by the guide lock 40 provided between the fitting holding portion 31 and the fitting component 10, with respect to the fitting holding portion 31 along the extending direction B of the first opening end edge 12 provided with the first water stop portion 14.

That is, the fitting reference surface 41 of the first guide portion 45 of the fitting component 10 is in sliding contact with the inner surface 34c of the first inner wall portion 34 arranged in parallel with the first side wall 32 of the fitting holding portion 31 on the inner side thereof along the extending direction B of the first opening end edge 12 of the peripheral wall 11, and the pair of the first engagement protruding portions 17 of the first guide portion 45 is in sliding contact with the upper end edge 34b of the first inner wall portion 34 as shown in FIG. 6.

As shown in FIG. 7, the second engagement protruding portion 19 of the second guide portion 49 of the fitting component 10 is in sliding contact with the upper end edge 35b of the second inner wall portion 35 (see FIG. 7).

Therefore, even when an assembly operator cannot directly see a fitted portion between the fitting holding portion 31 and the fitting component 10, the fitting reference surface 41 of the first guide portion 45 is in sliding contact with the inner surface 34c of the first inner wall portion 34, the first engagement protruding portions 17 of the first guide portion 45 and the second engagement protruding portion 19 of the second guide portion 49 are in sliding contact with the upper end edge 34b of the first inner wall portion 34 and the upper end edge 35b of the second inner wall portion 35 respectively, so that the fitting component 10 can be guided to the fitting start position (the position shown in FIGS. 8 and 9) simply by inserting the fitting component 10 horizontally from the diagonally right front of the fitting holding portion 31 into the fitting holding portion 31 of the housing 30 along the extending direction B of the first opening end edge 12.

When a height of the fitting component 10 to be horizontally inserted into the fitting holding portion 31 is lower than a predetermined height, the first engagement protruding portions 17 of the first guide portion 45 and the second engagement protruding portion 19 of the second guide portion 49 abut against a side end edge 34a of the first inner wall portion 34 and the side end edge 35b of the second inner wall portion 35, and the insertion is prevented. Therefore, the assembly operator can easily detect that the height is lower than the predetermined height when the fitting component 10 is inserted horizontally to the fitting holding portion 31.

When the fitting component 10 reaches the fitting start position, the first engagement protruding portions 17 of the first guide portion 45 and the second engagement protruding portion 19 of the second guide portion 49, which are respectively in sliding contact with the upper end edge 34b of the first inner wall part 34 and the upper end edge 35b of the second inner wall portion 35, are fitted into the first recessed portion 51 of the first inner wall portion 34 and the second recessed portion 53 of the second inner wall portion 35.

Therefore, the first engagement protruding portions 17 of the first guide portion 45 and the second engagement protruding portion 19 of the second guide portion 49 can reach bottom surfaces of the first recessed portion 51 of the first inner wall portion 34 and the second recessed portion 53 of the second inner wall portion 35 and guide the fitting component 10 by the fitting stroke distance S1 along the fitting direction A to the fitting end position below (the position shown in FIG. 10). That is, the fitting stroke distance S1 can be set by appropriately changing heights of the first engagement protruding portions 17 and the second engagement protruding portion 19 and depths of the first recessed portion 51 and the second recessed portion 53 along the fitting direction A.

Figure 11:
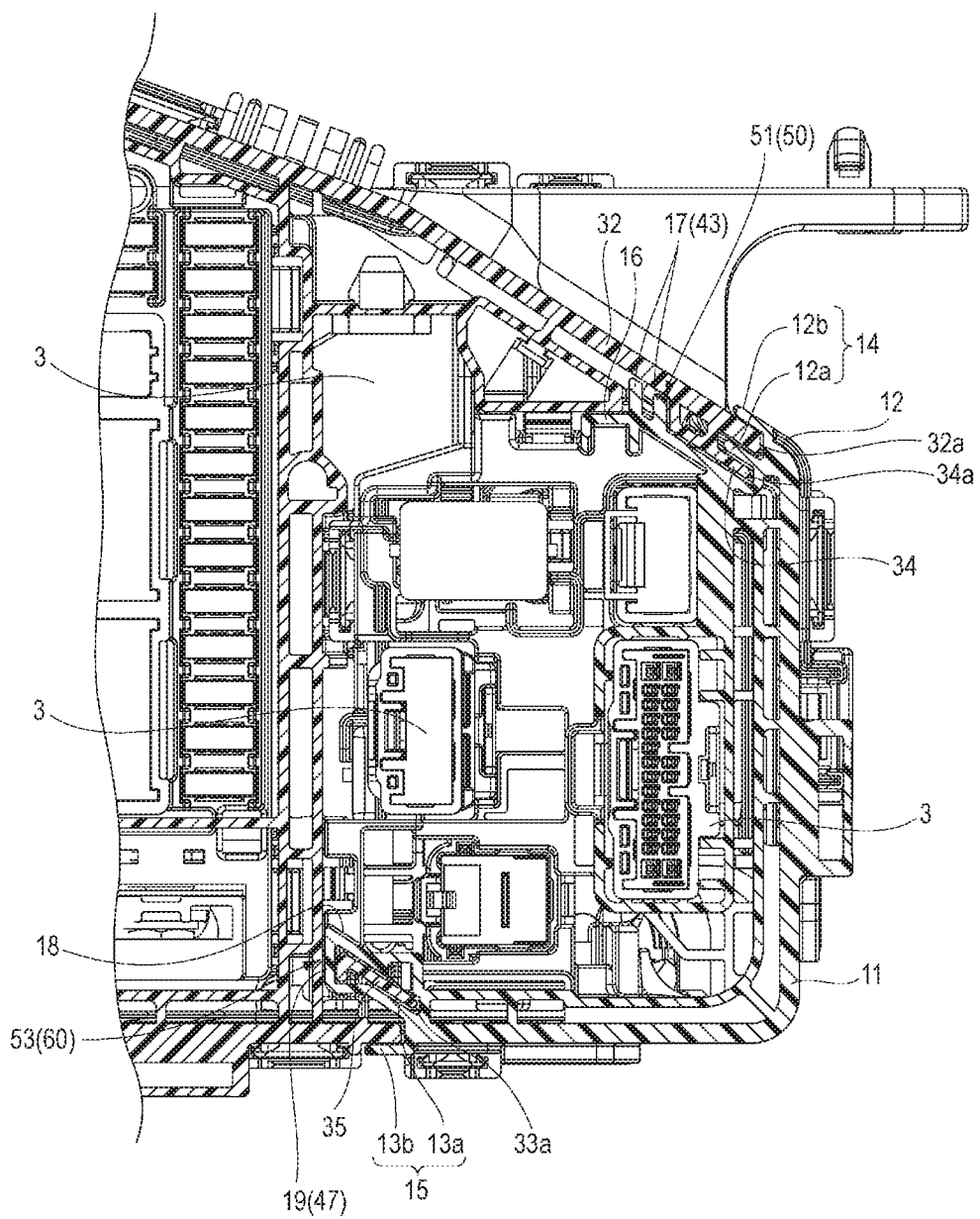
FIG. 11 is a cross-sectional view taken along line XI-XI of FIG. 10.
Figure 12:
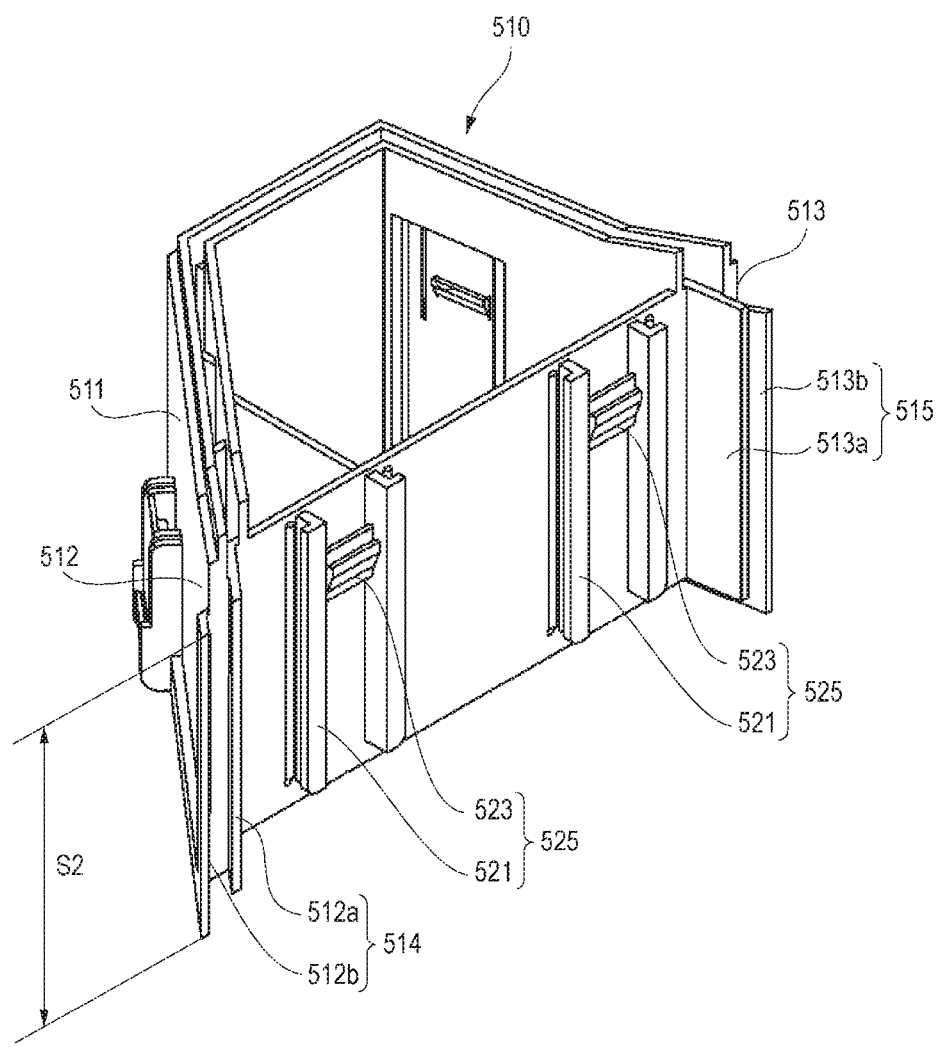
FIG. 12 is a perspective view showing a fitted portion of an accommodating member (fitting component) of an electric connection box in related art.

As shown in FIG. 11, the first engagement protruding portions 17 and the second engagement protruding portion 19 are respectively fitted into the first recessed portion 51 and the second recessed portion 53, and a lock claw 71 provided on the front side of the peripheral wall 11 is locked to a lock portion 73 provided on an outer surface of the front side of the electronic component accommodating chamber 26 (see FIG. 1), so that the fitting component 10 is fitted with and held by the fitting holding portion 31 in a locked state.

That is, the fitting component 10 is guided by the fitting stroke distance S1 which is shorter than the length L1 of the first water stop portion 14 and the second water stop portion 15 along the fitting direction A orthogonal to the extending directions B, C of the first and the second opening end edges 12, 13 such that the fitting component 10 is fitted with and held by the fitting holding portion 31.

Therefore, even when the assembly operator cannot directly see the fitted portion between the fitting holding portion 31 and the fitting component 10, the fitting component 10 can be easily fitted with and held by the fitting holding portion 31 with a relatively short fitting stroke due to the guide lock 40 provided between the fitting holding portion 31 and the fitting component 10, thereby improving assembling workability of the fitting component 10.

According to the electric connection box 1 according to the present embodiment, as shown in FIG. 3, the inner side wall 13a of the second water stop portion 15 is extended in parallel with the inner side wall 12a and the outer side wall 12b of the first water stop portion 14 along the extending direction B of the first opening end edge 12 of the peripheral wall 11. When the fitting component 10 is assembled to the fitting holding portion 31 of the housing 30, the fitting component 10 is guided by the guide lock 40 with respect to the fitting holding portion 31 along the extending direction B of the first opening end edge 12 provided with the first water stop portion 14. At this time, although the first opening end edge 12 and the second opening end edge 12 of the peripheral wall 11 are extended at different angles in the extending directions B, C, the inner side wall 13a of the second water stop portion 15 does not interfere with the corresponding side wall 33 of the fitting holding portion 31.

Therefore, when the fitting component 10 is assembled to the fitting holding portion 31 of the housing 30, the inner side walls 12a, 13a and the outer side walls 12b, 13b of the first water stop portion 14 and the second water stop portion 15 can be fitted from the tip end side (the front side) of the side walls 32, 33 of the fitting holding portion 31 even though the first opening end edge 12 and the second opening end edge 13 of the peripheral wall 11 are extended at different angles in the extending directions B, C.

Therefore, the inner side walls 12a, 13a and the outer side walls 12b, 13b of the first water stop portion 14 and the second water stop portion 15 are not necessarily fitted from an upper end side of the side walls 32, 33 of the fitting holding portion 31, and the fitting stroke with respect to the fitting holding portion 31 does not necessarily correspond to the heights (the length L1) of the opening end edges 12, 13 of the peripheral wall 11, thus a degree of freedom of assembly of the fitting component 10 is improved.

For example, when attaching and detaching the fitting component 10 to and from the fitting holding portion 31 of the housing 30 which is attached to the vehicle, there is a case where extra lengths of the plurality of electric wires 5 drawn downward from the fitting component 10 are short, and the fitting component 10 cannot be drawn beyond the fitting stroke distance corresponding to the heights (the length L1) of the opening end edges 12, 13 of the peripheral wall 11. Even in such a case, in the electric connection box 1 according to the present embodiment, the fitting component 10 can be assembled from the tip end side (the front side) of the side walls 32, 33 of the fitting holding portion 31 even though the first opening end edge 12 and the second opening end edge 13 of the fitting component 10, which includes the first water stop portion 14 and the second water stop portion 15, are extended at different angles in the extending directions B, C.

According to the electric connection box 1 according to the present embodiment, when the fitting component 10 is assembled to the fitting holding portion 31 of the housing 30, the fitting reference surface 41 of the first guide portion 45 provided inside the first water stop portion 14 of the fitting component 10 is in sliding contact with the inner surface 34c of the first inner wall portion 34 arranged in parallel with the first side wall 32 of the fitting holding portion 31 on the inner side thereof along the extending direction B of the first opening end edge 12 of the peripheral wall 11, and the first engagement portion 43 of the first guide portion 45 guides the fitting component 10 by the fitting stroke distance S1 along the fitting direction A with respect to the first engaged portion 50 of the upper end edge 34b of the first inner wall portion 34. Further, the second engagement portion 47 of the second guide portion 49 provided inside the second water stop portion 15 of the fitting component 10 guides the fitting component 10 by the fitting stroke distance S1 along the fitting direction A with respect to the second engaged portion 60 of the upper end edge 35b of the second inner wall portion 35 provided on the inner side of the second side wall 33 of the fitting holding portion 31.

Therefore, the assembly operator can easily fit the fitting component 10 with the fitting holding portion 31 and held the fitting component 10, thereby improving assembling workability of the fitting component 10 of the electric connection box 1.

According to the electric connection box 1 according to the present embodiment, the first engaged portion 50 is formed by the first recessed portion 51 recessed in the upper end edge 34b of the first inner wall portion 34. The first engagement portion 43 is formed by the first engagement protruding portions 17 that protrude from the outer surface 16a of the first engagement wall 16. The second engaged portion 60 is formed by the second recessed portion 53 recessed in the upper end edge 35b of the second inner wall portion 35. The second engagement portion 47 is formed by the second engagement protruding portion 19 that protrudes from the outer surface 18a of the second engagement wall 18.

Therefore, according to the electric connection box 1 according to the present embodiment, the guide lock 40 can be easily configured by the first guide portion 45 and the second guide portion 49 which are formed by simple concave-convex structures. Needless to say, the configuration of the first guide portion 45 and the second guide portion 49 is not limited to the configuration of the present embodiment, and various configurations can be adopted based on the spirit of the present invention.

Therefore, according to the electric connection box 1 according to the present embodiment described above, the fitting component 10 would be easily assembled to the fitting holding portion 31 of the housing 30.

The present invention is not limited to the above embodiment, and combinations of the respective configurations of the embodiment, or changes and applications made by those skilled in the art based on the description of the specification and the well-known technology are also intended by the present invention and are included within the scope to be protected.

For example, although the extending direction B of the first opening end edge 12 of the peripheral wall 11 of the fitting component 10 and the extending direction C of the second opening end edge 12 are extended at different angles in the electric connection box 1 according to the above embodiment, the extending direction of the first opening end edge and the extending direction of the second opening end edge of the peripheral wall of the fitting component may be extended in parallel in the fitting component according to the present invention, and the inner wall and the outer wall of the first water stop portion and the inner wall and the outer wall of the second water stop portion may be all extended in parallel.

In accordance with exemplary embodiments, the electric connection box may have configurations of any one of the following [1] to [4].

[1] An electric connection box (1) includes: a fitting component (10), in which an electronic component (3) and an electric wire (5) electrically connected to the electronic component (3) are assembled;

a housing (30), which includes a fitting holding portion (31), the fitting holding portion (31) being configured to fit with and hold the fitting component (10);

a peripheral wall (11), which has a substantially U-shaped cross section and forms an outer side surface of the filling component (10);

a first water stop portion (14), which is provided along first opening end edge (12) of the peripheral wall (11) and includes an inner side wall (12a) and an outer side wall (12b), the inner side wall (12a) and the outer side wall (12b) covering a side end edge (32a) of a first side wall (32) of the fitting holding portion (31) from inside and outside;

a second water stop portion (15), which is provided along second opening end edge (13) of the peripheral wall (11) and includes an inner side wall (13a) and an outer side wall (13b), the inner side wall (13a) and the outer side wall (13b) covering a side end edge (33a) of a second side wall (33) of the fitting holding portion (31) from inside and outside; and a guide lock (40), which is provided between the fitting holding portion (31) and the fitting component (10) to guide the fitting component (10) with respect to the fitting holding portion (31) along an extending direction (B) of the first opening end edge (12) provided with the first water stop portion (14), and to guide the fitting component (10) by a fitting stroke distance (S1) along a fitting direction (A) orthogonal to the extending direction (B) along the first and the second opening end edges (12, 13) such that the fitting component (10) is fitted and held, the fitting stroke distance (S1) being shorter than a length (L1) of the first water stop portion (14) and the second water stop portion (15).

[2] The electric connection box (1) according to [1], in which the extending direction (B) of the first opening end edge (12) and an extending direction (C) of the second opening end edge (13) are different from each other.

The inner side wall (12a) and the outer side wall (12b) of the first water stop portion (14) and the inner wall (13a) of the second water stop portion (15) are extended in parallel along the extending direction (B) of the first opening end edge (12) of the peripheral wall (11).

The outer side wall (13b) of the second water stop portion (15) is extended along the extending direction (C) of the second opening end edge (13) of the peripheral wall (11).

[3] The electric connection box (1) according to [2], in which the guide lock (40) includes:

a first guide portion (45) provided inside the first water stop portion (14), which includes a fitting reference surface (41) and a first engagement portion (43), the fitting reference surface (41) being in sliding contact with an inner surface (34c) of a first inner wall portion (34) arranged in parallel with the first side wall (32) on a inner side thereof along the extending direction of the first opening end edge (12), the first engagement portion (43) guiding the fitting component (10) by the fitting stroke distance (S1) along the fitting direction (A) with respect to a first engaged portion (50) of an upper end edge (34b) of the first inner wall portion (34); and a second guide portion (49) provided inside the second water stop portion (15), which includes a second engagement portion (47) which guides the fitting component (10) by the fitting stroke distance (S1) along the fitting direction (A) with respect to a second engaged portion (60) of an upper end edge (35b) of a second inner wall portion (35) provided on an inner side of the second side wall (33).

[4] The electric connection box (1) according to [3], in which the first engaged portion (50) is a first recessed portion (51) recessed in the upper end edge (34b) of the first inner wall portion (34).

The first engagement portion (43) is a first engagement protruding portion (17) that protrudes from an outer surface (16a) of a first engagement wall (16) provided inside the first water stop portion (14) and engages with the first recessed portion (51).

The second engaged portion (60) is a second recessed portion (53) recessed in the upper end edge (35b) of the second inner wall portion (35) provided on the inner side of the second side wall (33).

The second engagement portion (47) is a second engagement protruding portion (19) that protrudes from an outer surface (18a) of a second engagement wall (18) provided inside the second water stop portion (15) and engages with the second recessed portion (53).

According to the electric connection box having the above configuration [1], when the fitting component is assembled to the fitting holding portion of the housing, the fitting component is guided, by the guide lock provided between the fitting holding portion and the fitting component, with respect to the fitting holding portion along the extending direction of the first opening end edge provided with the first water stop portion. Further, the fitting component is guided by the fitting stroke distance which is shorter than the length of the first water stop portion and the second water stop portion along the fitting direction orthogonal to the extending direction such that the fitting component is fitted with and held by the fitting holding portion.

Therefore, even when an assembly operator cannot directly see a fitted portion between the fitting holding portion and the fitting component, the fitting component can be easily fitted with and held by the fitting holding portion with a relatively short fitting stroke due to the guide lock provided between the fitting holding portion and the fitting component, thereby improving assembling workability of the fitting component of the electric connection box.

According to the electric connection box having the above configuration [2], the inner side wall of the second water stop portion is extended in parallel with the inner side wall and the outer side wall of the first water stop portion along the extending direction of the first opening end edge of the peripheral wall. When the fitting component is assembled to the fitting holding portion of the housing, the fitting component is guided by the guide lock with respect to the fitting holding portion along the extending direction of the first opening end edge provided with the first water stop portion. At this time, although the first opening end edge and the second opening end edge of the peripheral wall are extended at different angles in the extending direction, the inner side wall of the second water stop portion does not interfere with the corresponding side wall of the fitting holding portion.

Therefore, when the fitting component is assembled to the fitting holding portion of the housing, the inner side walls and the outer side walls of the first water stop portion and the second water stop portion can be fitted from the tip end side (the front side) of the side wall of the fitting holding portion even though the first opening end edge and the second opening end edge of the peripheral wall are extended at different angles in the extending direction. Therefore, the inner side walls and the outer side walls of the first water stop portion and the second water stop portion are not necessarily fitted from the upper end side of the side wall of the fitting holding portion, and the fitting stroke with respect to the fitting holding portion does not necessarily correspond to the height of the opening end edge of the peripheral wall, thus a degree of freedom of assembly of the fitting component is improved.

According to the electric connection box having the above configuration [3], when the fitting component is assembled to the fitting holding portion of the housing, the fitting reference surface of the first guide portion provided inside the first water stop portion of the fitting component is in sliding contact with the inner surface of the first inner wall portion arranged in parallel with the one side wall of the fitting holding portion on the inner side thereof along the extending direction of the first opening end edge of the peripheral wall, and the first engagement portion of the first guide portion guides the fitting component by the fitting stroke distance along the fitting direction with respect to the first engaged portion of the upper end edge of the first inner wall portion. Further, the second engagement portion of the second guide portion provided inside the second water stop portion of the fitting component guides the fitting component by the fitting stroke distance along the fitting direction with respect to the second engaged portion of the upper end edge of the second inner wall portion provided on the inner side of the other side wall of the fitting holding portion.

Therefore, the assembly operator can easily fit the fitting component with the fitting holding portion and held the fitting component, thereby improving assembling workability of the fining component of the electric connection box.

According to the electric connection box having the above configuration [4], the first engaged portion is formed by the first recessed portion recessed in the upper end edge of the first inner wall portion. The first engagement portion is formed by the first engagement protruding portion that protrudes from the outer surface of the first engagement wall. The second engaged portion is formed by the second recessed portion recessed in the upper end edge of the second inner wall portion. The second engagement portion is formed by the second engagement protruding portion that protrudes from the outer surface of the second engagement wall.

Therefore, the guide lock can be easily configured by the first guide portion and the second guide portion which are formed by simple concave-convex structures.

In accordance with the electric connection box of the exemplary embodiments, the fitting component would be easily assembled to the fitting holding portion of the housing.

What is claimed is:

1. An electric connection box comprising:
   a fitting component in which an electronic component and an electric wire electrically connected to the electronic component are assembled;
   a housing including a fitting holding portion, the fitting holding portion being configured to fit with and hold the fitting component;
   a peripheral wall forming an outer side surface of the fitting component;
   a first water stop portion, which is provided along a first opening end edge of the peripheral wall and includes an inner side wall and an outer side wall, the inner side wall and the outer side wall being configured to cover a side end edge of a first side wall of the fitting holding portion from inside and outside;
   a second water stop portion, which is provided along a second opening end edge of the peripheral wall and includes an inner side wall and an outer side wall, the inner side wall and the outer side wall being configured to cover a side end edge of a second side wall of the fitting holding portion from inside and outside; and
   a guide lock, which is provided between the fitting holding portion and the fitting component to guide the fitting component with respect to the fitting holding portion along an extending direction of the first opening end edge, and to guide the fitting component by a fitting stroke distance along a fitting direction orthogonal to the extending direction along the first opening end edge and the second opening end edge such that the fitting component is fitted and held, the fitting stroke distance being shorter than a length of the first water stop portion and the second water stop portion.

2. The electric connection box according to claim 1, wherein the extending direction of the first opening end edge and an extending direction of the second opening end edge are different from each other,
   wherein the inner side wall and the outer side wall of the first water stop portion and the inner wall of the second water stop portion are extended in parallel along the extending direction of the first opening end edge, and
   wherein the outer side wall of the second water stop portion is extended along the extending direction of the second opening end edge.

3. The electric connection box according to claim 1, wherein the guide lock includes:
   a first guide portion provided inside the first water stop portion, wherein the first guide portion includes a fitting reference surface and a first engagement portion, wherein the fitting reference surface is configured to he in sliding contact with an inner surface of a first inner wall portion arranged in parallel with the first side wall on an inner side of the first side wall along the extending direction of the first opening end edge, wherein the first engagement portion is configured to guide the fitting component by the fitting stroke distance along the fitting direction with respect to a first engaged portion of an upper end edge of the first inner wall portion; and
   a second guide portion provided inside the second water stop portion, wherein the second guide portion includes a second engagement portion which guides the fitting component by the fitting stroke distance along the fitting direction with respect to a second engaged portion of an upper end edge of a second inner wall portion provided on an inner side of the second side wall.

4. The electric connection box according to claim 3, wherein the first engaged portion is a first recessed portion recessed in the upper end edge of the first inner wall portion,
   wherein the first engagement portion is a first engagement protruding portion that protrudes from an outer surface of a first engagement wall provided inside the first water stop portion and configured to engage with the first recessed portion,
   wherein the second engaged portion is a second recessed portion recessed in the upper end edge of the second inner wall portion provided on the inner side of the second side wall, and
   wherein the second engagement portion is a second engagement protruding portion that protrudes from an outer surface of a second engagement wall provided inside the second water stop portion and configured to engage with the second recessed portion.

* * * * *